Patented Aug. 21, 1928.

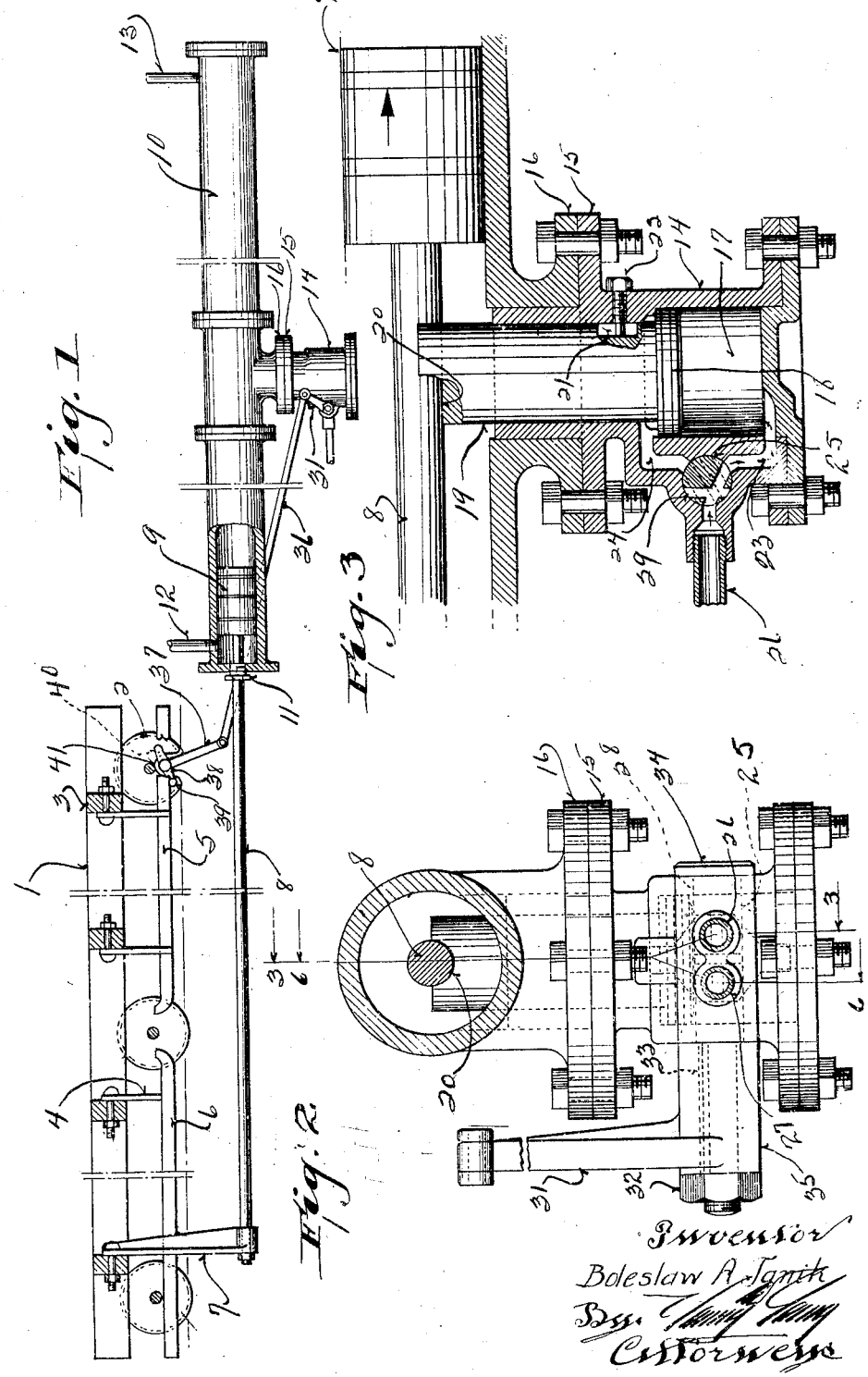
Aug. 21, 1928.
B. A. JANIK
1,681,615
AUXILIARY BEARING FOR SAW CARRIAGE PISTON RODS
Filed March 28, 1927
2 Sheets-Sheet 1

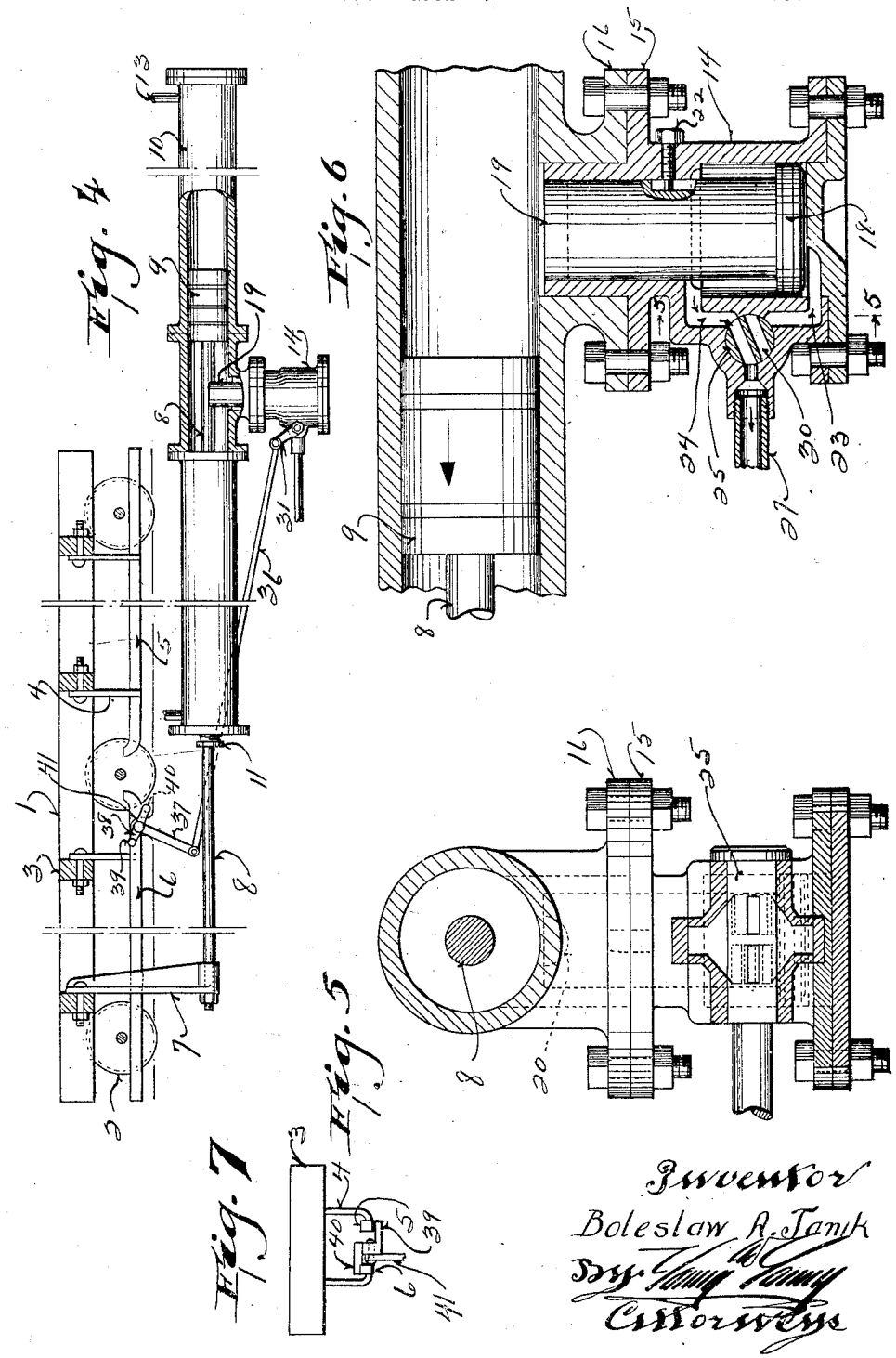

1,681,615

UNITED STATES PATENT OFFICE.

BOLESLAW A. JANIK, OF MILWAUKEE, WISCONSIN.

AUXILIARY BEARING FOR SAW-CARRIAGE PISTON RODS.

Application filed March 28, 1927. Serial No. 179,010.

This invention relates to an auxiliary bearing for saw carriage piston rods.

In saw mill work it is the usual practice to provide a carriage which carries the operator and the sawing mechanism and which quickly travels lengthwise of the log and is operated by steam, pneumatic, or other means. Usually a piston and an elongated piston rod are employed for actuating the carriage, and it is immediately apparent that a very long stretch of unsupported piston rod is presented by this construction whose weight causes rapid wear upon the packing gland at the cylinder head and also rapid wear between the underside of the piston and the cylinder, as the piston at certain portions of the stroke carries approximately half of the weight of this piston rod.

This invention is designed to provide means for relieving the piston, packing gland and associated parts of a major part of the weight of the piston rod, and objects of such invention are to provide means for supporting the piston rod, so that the cylinder, piston, packing gland and rod are subjected to less wear than has heretofore been possible and, consequently, a longer life and a smoother operation of the apparatus is secured.

More specifically, objects of this invention are to provide an automatically actuated support for carrying the major part of the weight of the piston rod and associated with automatically controlled means, whereby the support is moved into and out of engagement with the rod within the cylinder and is automatically moved out of the way of the reciprocating piston, so that no thought on the part of the operator is required as the device is wholly automatic in its action.

Further objects are to provide means controlled by cams carried by the carriage so that the cams can be adjusted to any type or size of carriage and will accordingly control the automatic support.

An embodiment of the invention is shown in the accompanying drawings in which:

Figure 1 is a diagrammatic view somewhat in section showing the carriage, the operating cylinder and piston, the cams, and associated parts, with part of the figure in section.

Figure 2 is a transverse sectional view through the cylinder;

Figure 3 is a sectional view on the line 3—3 of Figure 2;

Figure 4 is a view corresponding to Figure 1 showing the piston and carriage in another position;

Figure 5 is a sectional view on the line 5—5 of Figure 6;

Figure 6 is a sectional view on the line 6—6 of Figure 2.

Fig. 7 is a detailed view of a portion of the operating mechanism.

Referring to the drawings, it will be seen that a saw carriage 1 has been illustrated as carried by a plurality of supporting wheels 2 which run upon tracks in the usual manner. The carriage is provided with a plurality of transverse braces 3 which are equipped with downwardly extending members 4. A pair of cams 5 and 6 are supported by the members 4, as shown in Figures 1 and 4, and these cams control the actuation of the automatic support in a manner hereinafter described. The carriage is further provided with a rigidly mounted arm 7 which is bolted to the outer end of an elongated piston rod 8. The inner end of the piston rod is secured to the piston 9 which operates within the elongated cylinder 10. The piston rod, it will be noted, passes through a packing gland 11 in the front head of the cylinder. The piston is moved back and forth by the admission of steam, compressed air, or other fluid, through the pipes 12 and 13 by any conventional means, and the particular means selected plays no part in this invention. The center of the cylinder is supported by a central standard 14 which is provided with an upper flanged part 15 to which the flange 16 of the cylinder is bolted, as shown most clearly in Figures 3 and 6. The standard 14 is in reality an auxiliary cylinder, such cylinder being indicated by the reference character 17. Within this cylinder, a piston 18 fits and has a limited sliding motion, its two extreme positions being shown in Figures 3 and 6. This piston is rigid with the plunger or support 19, and the piston and plunger form together the automatic support.

It is to be noted from Figures 2, 3 and 4 particularly that the automatic support is provided with a semi-cylindrical cutout 20 in its upper face which is in exact conformity to the elongated piston rod 8. When the parts are in the position shown in Figures 2, 3, and 4, the support actually carries a large portion of the weight of the piston rod and this proportionate part of the weight of the piston rod increases as the piston travels towards the rear end of the cylinder in the direction shown by the arrow in Figure 3. When the piston is travelling in the reverse direction, the support is operative until approached by the piston. When the piston is in proximity to the support, such support is suddenly moved downwardly into the cylindrical supporting standard, as shown in Figures 5 and 6, and consequently moves out of the way of the piston. It remains in this position until the piston has again passed the support on its rearward travel, as indicated in Figure 3. At this time, the support again rises and takes the load of the piston rod.

Preferably, the support is provided with a slot 21 (see Figure 3) which cooperates with a screw or bolt 22 and thus prevents rotation of the support, consequently maintaining alignment of the notch or cutout 20 and the under side of the piston rod.

The cylinder 17 communicates at its end with a pair of ports 23 and 24 through which steam or other fluid is admitted or exhausted in a manner hereinafter described.

It is to be noted from Figures 2, 3, 5, and 6, that the standard 14 is provided with an enlargement on one side which revolubly receives the rotary valve 25. This rotary valve controls the connection of the steam pipe 26 and the exhaust pipe 27 (see Figure 2) with opposite ends of the cylinder 17 and, consequently, controls the operation of the piston 18. The valve, it is to be understood, may take several different forms, but in the form shown, it is provided with two groups of ports, one group indicated by the reference character 29 in Figure 3, controls the admission of steam to first one end and then the other end of the cylinder 17. The other group of ports indicated by the reference character 30 in Figure 6 controls the connection of alternate ends of the cylinder with the exhaust pipe 27. The valve thus rocks through a limited angle and is controlled in its action by means of the lever or rock arm 31 rigid therewith and held in place in any suitable maner, as by means of the nut 32 (see Figure 2). Preferably, the rock arm 31 is rigidly secured to the valve by means of a key 33. The outer end of the valve 25 is provided with an enlargement head 34 (see Figure 2). Thus, the correct positioning of the valve is maintained by the enlarged head 34 and the hub 35 of the rocking lever 31.

The rocking lever 31 is connected by means of a pitman or link 36 (see Figures 1 and 4) to a cam controlled rocking lever 37. This rocking lever 37 is provided with a pair of arms 38 which are equipped with pins 39 and 40, as shown most clearly in Figure 7. These pins 39 and 40 cooperate with the elongated cams 5 and 6, it being noted that the cam 5 is positioned towards the observer when viewed as shown in Figure 4, and the cam 6 positioned rearwardly of the plane of the cam 5, so that the cams pass on opposite sides of the supporting lug 41 upon which the lever 37 is pivotally mounted. It is to be noted that the cams 5 and 6 have curved juxtaposed ends adjacent the central portion of the carriage and the exact location of these ends is such that the lever is rocked at a point so timed that the support 19 will move out of the way of the piston for an outward direction of travel and will move inwardly immediately after the passage of the piston for an inward motion of the carriage.

It is to be distinctly understood that although one automatic support has been shown that obviously any number could be employed and could be controlled either simultaneously or independently. For example, a support for the outer stretch of the valve rod could be provided, if desired, and such support could be operated in identically the same maner as that just described.

It will be seen that a novel construction has been provided by this invention which eliminates the wear heretofore occasioned by the weight of the piston rod, and it will be seen further that the support is wholly automatic in its action and also moves out of the way of the piston at the correct instant without conscious effort on the part of the operator.

It will be seen further that the device is eminently practical and may be readily produced by simple methods.

Further it is to be noted that the device is substantial and sturdy in its construction and is not likely to get out of order.

Although the invention has been described in considerable detail such description is intended as illustrative rather than limiting as the invention may be variously embodied and as the scope of such invention is to be determined as claimed.

I claim:

1. In a saw mill, the combination of a reciprocatory carriage, a cylinder, a piston located within said cylinder, an elongated piston rod connecting said piston and carriage, an auxiliary cylinder and an auxiliary piston cooperating therewith and provided with a support for directly engaging said piston rod for maintaining said rod straight and fluid pressure means controlled by said carriage for controlling the operation of said auxiliary piston to move said support into one position in engagement with said piston rod and into another position out of the way of said first mentioned piston.

2. In a saw mill, the combination of a reciprocatory carriage, a cylinder, a piston located within said cylinder, an elongated piston rod connecting said piston and carriage, an auxiliary cylinder and an auxiliary piston cooperating therewith and provided with a support for directly engaging said piston rod for maintaining said rod straight, and fluid pressure means controlled by said carriage for controlling the operation of said auxiliary piston to move said support into one position in engagement with said piston rod and into another position out of the way of said first mentioned piston, the axis of the auxiliary cylinder being at right angles to the axis of the first mentioned cylinder.

3. The combination of a reciprocatory saw carriage, a main cylinder, a main piston mounted within said cylinder, an elongated piston rod connecting said piston and carriage, an auxiliary cylinder mounted at right angles to and intermediate the ends of said main cylinder, an auxiliary piston located within said auxiliary cylinder and provided with a support for directly engaging said piston rod for maintaining said rod straight, a valve controlling the operation of said auxiliary piston, and cam means associated with said carriage for causing a timed action of said auxiliary piston through the medium of said valve, whereby said support is alternately moved into engagement with the piston rod and out of the way of the main piston.

4. The combination of a reciprocatory saw carriage, a main cylinder, a main piston mounted within said cylinder, an elongated piston rod connecting said piston and carriage, an auxiliary cylinder mounted at right angles to and intermediate the ends of said main cylinder, an auxiliary piston located within said auxiliary cylinder and provided with a support for engaging said piston rod, a rocking valve controlling the operation of said auxiliary piston, cams carried by said carriage, and means controlled by said cams for controlling the rocking motion of said valve.

In testimony that I claim the foregoing I have hereunto set my hand at Milwaukee, in the county of Milwaukee and State of Wisconsin.

BOLESLAW A. JANIK.